(12) United States Patent
Tsai et al.

(10) Patent No.: US 10,836,870 B2
(45) Date of Patent: Nov. 17, 2020

(54) COPOLYESTER RESIN FOR PREPARING A LOW-MELTING COPOLYESTER FIBER, THE LOW-MELTING COPOLYESTER FIBER PREPARED THEREFROM, AND PROCESS FOR PREPARING THE LOW-MELTING COPOLYESTER FIBER

(71) Applicant: FAR EASTERN NEW CENTURY CORPORATION, Taipei (TW)

(72) Inventors: Hsiang-Chin Tsai, Taipei (TW); Shih-Hsiung Chen, Taipei (TW); Lewis Yu, Taipei (TW)

(73) Assignee: FAR EASTERN NEW CENTURY CORPORATION, Taipei (TW)

( * ) Notice: Subject to any disclaimer, the term of this patent is extended or adjusted under 35 U.S.C. 154(b) by 52 days.

(21) Appl. No.: 16/410,808

(22) Filed: May 13, 2019

(65) Prior Publication Data

US 2020/0095382 A1   Mar. 26, 2020

(30) Foreign Application Priority Data

Sep. 20, 2018   (TW) .............................. 107133204 A

(51) Int. Cl.
| | | |
|---|---|---|
| *C08J 3/00* | (2006.01) | |
| *D01F 6/84* | (2006.01) | |
| *C08G 63/183* | (2006.01) | |
| *C08G 63/672* | (2006.01) | |
| *C08L 67/02* | (2006.01) | |
| *D01F 6/92* | (2006.01) | |
| *D01F 1/10* | (2006.01) | |

(52) U.S. Cl.
CPC ............ *C08J 3/005* (2013.01); *C08G 63/183* (2013.01); *C08G 63/672* (2013.01); *C08L 67/02* (2013.01); *D01F 1/10* (2013.01); *D01F 6/84* (2013.01); *D01F 6/92* (2013.01); *C08J 2367/02* (2013.01); *C08J 2467/02* (2013.01)

(58) Field of Classification Search
CPC ..... D01F 1/10; D01F 8/14; D01F 6/92; D01F 6/84; D01F 6/82; D01F 6/62; D01F 6/46; D04H 1/52; D04H 1/54; D04H 1/62; D04H 1/4382; D04H 1/435; D04H 1/4291; C08L 23/00; C08L 77/00; C08L 69/00; C08L 67/00; C08L 67/02; C08J 2467/02; C08J 2367/02; C08G 63/199; C08G 63/83; C08G 63/85; C08G 63/18; C08G 63/82; C08G 63/183; C08G 63/672
See application file for complete search history.

(56) References Cited

U.S. PATENT DOCUMENTS

2004/0010073 A1* 1/2004 Shiga ..................... C08L 67/00
524/539

FOREIGN PATENT DOCUMENTS

EP          1115925 B1    8/2005

* cited by examiner

*Primary Examiner* — Christopher M Rodd
(74) *Attorney, Agent, or Firm* — MLO, a professional corp.

(57) ABSTRACT

A copolyester resin for preparing a low-melting copolyester fiber is made by compounding a first copolyester with a second copolyester in a weight ratio of the first copolyester to the second copolyester of from 94:6 to 98:2. The first copolyester is obtained by subjecting terephthalic acid, ethylene glycol, isophthalic acid, and diethylene glycol to a copolymerization, and the second copolyester is obtained by subjecting terephthalic acid, ethylene glycol, and neopentyl glycol to another copolymerization.

7 Claims, 1 Drawing Sheet

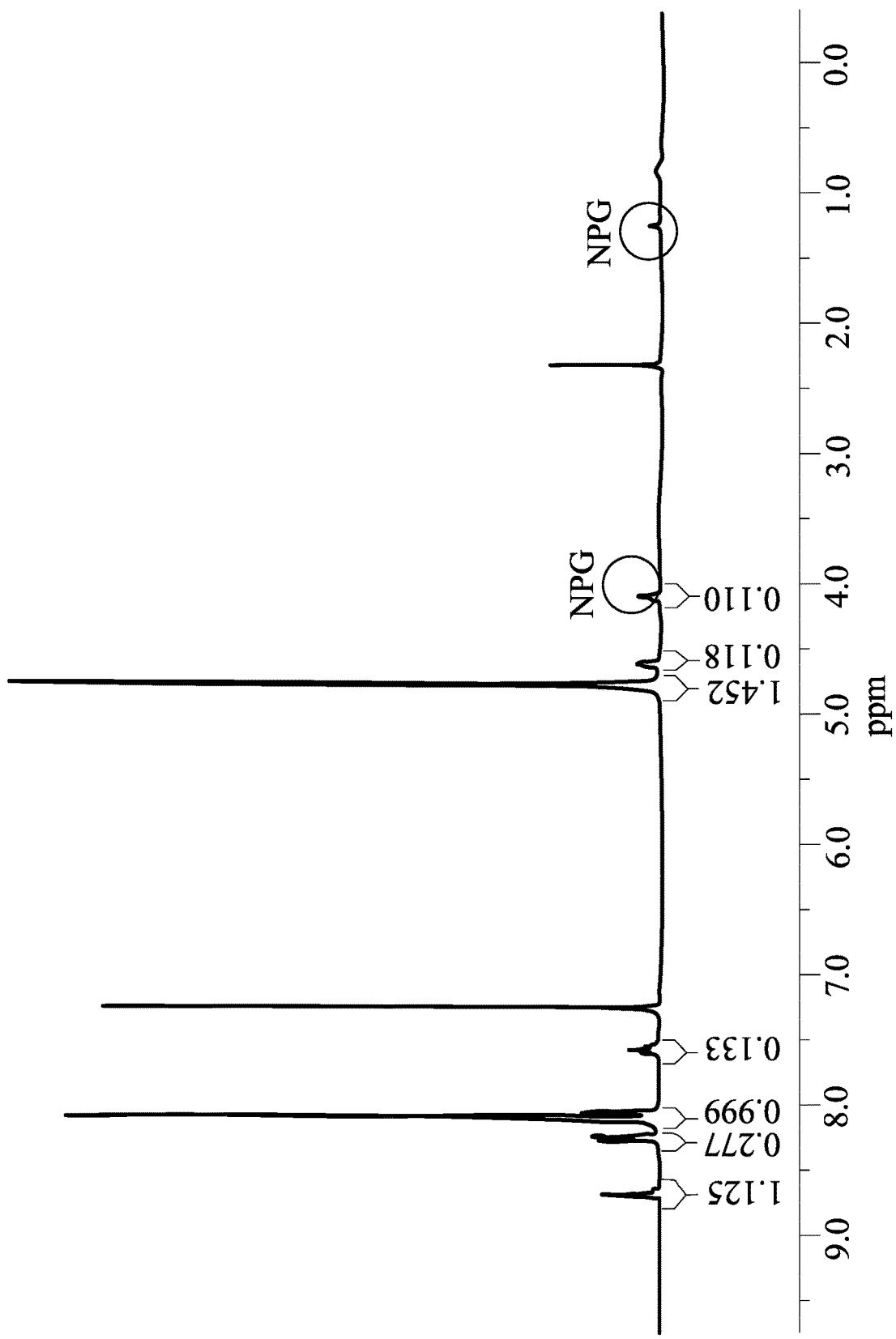

US 10,836,870 B2

COPOLYESTER RESIN FOR PREPARING A LOW-MELTING COPOLYESTER FIBER, THE LOW-MELTING COPOLYESTER FIBER PREPARED THEREFROM, AND PROCESS FOR PREPARING THE LOW-MELTING COPOLYESTER FIBER

CROSS-REFERENCE TO RELATED APPLICATION

This application claims priority of Taiwanese Application No. 107133204, filed on Sep. 20, 2018.

FIELD

The disclosure relates to a copolyester resin, and more particularly to a copolyester resin for preparing a low-melting copolyester fiber. The disclosure also relates to the low-melting copolyester fiber prepared from the copolyester resin, and a process for preparing the low-melting copolyester fiber.

BACKGROUND

A low-melting copolyester is a modified polyester having a melting point ranging from 100° C. to 210° C. Due to the fact that the low-melting copolyester retains characteristics of general polyesters and has a good compatibility with the general polyesters, and that it further has advantages of low-melting point, superior molten fluidity, and the like, it is widely used in woven fabrics, non-woven fabrics, building materials, coatings, and the like.

European Patent No. EP 1115925 B1 discloses a fiber comprising a polyester formed from a reaction product of a glycol component with a dicarboxylic acid component. The glycol component comprises neopentyl glycol and ethylene glycol. The dicarboxylic acid component comprises a dicarboxylic acid component which is an acid, anhydride, acid chloride or ester of an aromatic dicarboxylic acid, an aliphatic dicarboxylic acid, and a cycloaliphatic dicarboxylic acid. Specifically, the dicarboxylic acid component is an ester or mixture of esters of terephthalic acid, isophthalic acid, naphthalenedicarboxylic acid, or 1,3- or 1,4-cyclohexanedicarboxylic acid. When the fiber disclosed in this prior art is used as a binder fiber to bond polyester fibers (for example, polyethylene terephthalate fibers) or other types of fibers, the bonding strength between the binder fiber and the polyester fibers or other types of fibers is often unsatisfactory, therefore failing to meet the requirement in the art.

SUMMARY

Therefore, a first object of the disclosure is to provide copolyester resin for preparing a low-melting copolyester fiber which can overcome the aforesaid shortcoming of the prior art.

A second object of the disclosure is to provide a low-melting copolyester fiber prepared from the copolyester resin.

A third object of the disclosure is to provide a process for preparing the low-melting copolyester fiber.

According to a first aspect of the disclosure, there is provided a copolyester resin for preparing a low-melting copolyester fiber. The copolyester resin is made by compounding a first copolyester with a second copolyester in a weight ratio of the first copolyester to the second copolyester of from 94:6 to 98:2. The first copolyester is obtained by subjecting terephthalic acid, ethylene glycol, isophthalic acid, and diethylene glycol to a copolymerization, and the second copolyester is obtained by subjecting terephthalic acid, ethylene glycol, and neopentyl glycol to another copolymerization.

According to a second aspect of the disclosure, there is provided a low-melting copolyester fiber prepared by a process comprising the steps of:
(a) compounding a first copolyester and a second copolyester in a weight ratio of the first copolyester to the second copolyester of from 94:6 to 98:2 to make a copolyester resin, wherein
the first copolyester is obtained by subjecting terephthalic acid, ethylene glycol, isophthalic acid, and diethylene glycol to a copolymerization, and
the second copolyester is obtained by subjecting terephthalic acid, ethylene glycol, and neopentyl glycol to another copolymerization; and
(b) spinning the copolyester resin into fibers.

According to a third aspect of the disclosure, there is provided a process for preparing a low-melting copolyester fiber, comprising the steps of:
(a) compounding a first copolyester and a second copolyester in a weight ratio of the first copolyester to the second copolyester of from 94:6 to 98:2 to make a copolyester resin, wherein
the first copolyester is obtained by subjecting terephthalic acid, ethylene glycol, isophthalic acid, and diethylene glycol to a copolymerization, and
the second copolyester is obtained by subjecting terephthalic acid, ethylene glycol, and neopentyl glycol to another copolymerization; and
(b) spinning the copolyester resin into fibers.

BRIEF DESCRIPTION OF THE DRAWINGS

Other features and advantages of the disclosure will become apparent in the following detailed description of the embodiment(s) with reference to accompanying FIG. 1, which is a nuclear magnetic resonance (referred to as NMR hereinafter) spectrum of a copolyester resin of Example 1.

DETAILED DESCRIPTION

A copolyester resin for preparing a low-melting copolyester fiber according to the disclosure is made by compounding a first copolyester with a second copolyester in a weight ratio of the first copolyester to the second copolyester of from 94:6 to 98:2. The first copolyester is obtained by subjecting terephthalic acid, ethylene glycol, isophthalic acid, and diethylene glycol to a copolymerization, and the second copolyester is obtained by subjecting terephthalic acid, ethylene glycol, and neopentyl glycol to another copolymerization.

In certain embodiments, the weight ratio of the first copolyester to the second copolyester is in a range from 95:5 to 97:3. In certain embodiments, the weight ratio of the first copolyester to the second copolyester is 97:3.

As used herein, the term "compounding" means to blend the first copolyester with the second copolyester under conditions in which the first copolyester will not react with the second copolyester.

For example, the first copolyester can be physically compounded with the second copolyester in any suitable compounding devices well known in the art, such as a single-screw extruder, a twin-screw extruder, a Banbury mixer, or the like. The first copolyester and the second copolyester can be charged directly into the compounding device in a form of, for example, pellets, but are limited thereto, and are compounded with each other in the compounding device at a temperature ranging, for example, from 180° C. to 240° C.

The copolymerization for obtaining each of the first copolyester and the second copolyester is implemented by an esterification step, followed by a polycondensation step.

The esterification step is implemented by subjecting the dicarboxylic acid monomeric component (i.e., terephthalic acid and isophthalic acid for the first copolyester, and terephthalic acid for the second copolyester) and the diol monomeric component (i.e., ethylene glycol and diethylene glycol for the first copolyester, and ethylene glycol and neopentyl glycol for the second copolyester) to an esterification reaction. In certain embodiment, the esterification step can be implemented at a temperature ranging from 240° C. to 260° C. for a period ranging from 5 hours to 6 hours.

The polycondensation step can be implemented according to any methods well known in the art. For example, the polycondensation step can be implemented in the presence of a catalyst and a thermal stabilizer. A non-limiting example of the catalyst is antimony oxide ($Sb_2O_3$). The thermal stabilizer is used to prevent the thus formed copolyester from oxidation and/or decomposition during the polycondensation step. A non-limiting example of the thermal stabilizer is phosphoric acid. In certain embodiments, the polycondensation step can be implemented at a temperature ranging from 270° C. to 290° C. for a period ranging from 6 hours to 8 hours.

In certain embodiments, the isophthalic acid is in an amount ranging from 38 mol % to 40 mol % based on a total molar amount of the terephthalic acid and the isophthalic acid.

In certain embodiments, the diethylene glycol is in an amount ranging from 6 mol % to 8 mol % based on a total molar amount of the ethylene glycol, the diethylene glycol, and the neopentyl glycol.

In certain embodiments, the neopentyl glycol is in an amount ranging from 1 mol % to 1.6 mol % based on a total molar amount of the ethylene glycol, the diethylene glycol, and the neopentyl glycol.

A method for preparing a low-melting copolyester fiber according to the disclosure comprises the steps of:

(a) compounding a first copolyester and a second copolyester in a weight ratio of the first copolyester to the second copolyester of from 94:6 to 98:2 to make a copolyester resin, wherein
the first copolyester is obtained by subjecting terephthalic acid, ethylene glycol, isophthalic acid, and diethylene glycol to a copolymerization, and
the second copolyester is obtained by subjecting terephthalic acid, ethylene glycol, and neopentyl glycol to another copolymerization; and (b) spinning the copolyester resin into fibers.

The details for step (a) have been described above, and therefore will be omitted herein.

Step (b) can be implemented by any suitable means well known in the art.

In certain embodiments, step (b) is implemented using a melt-spinning machine provided with a spinneret which is formed with orifices having a diameter of from 0.4 to 0.6 mm.

In certain embodiments, step (b) is implemented at a temperature ranging from 220° C. to 240° C. In certain embodiments, step (b) is implemented at a temperature ranging from 225° C. to 235° C.

Examples of the disclosure will be described hereinafter. It is to be understood that these examples are exemplary and explanatory and should not be construed as a limitation to the disclosure.

Preparation Example 1

Terephthalic acid (208.55 g), ethylene glycol (147.40 g), isophthalic acid (131.67 g), and diethylene glycol (19.55 g) were added into an autoclave (1 L), followed by an esterification reaction which was implemented for 5.5 hours and was terminated at a temperature of 250° C. to obtain an esterification product.

Antimony oxide ($Sb_2O_3$, 0.12 g) and phosphoric acid (0.35 g) were then added into the autoclave, followed by a polycondensation reaction which was implemented for 7 hours and was terminated at a temperature of 280° C. to obtain a first copolyester, which was pelletized to obtain first copolyester pellets.

Preparation Example 2

Terephthalic acid (331.34 g), ethylene glycol (123.75 g), and neopentyl glycol (41.52 g) were added into an autoclave (1 L), followed by an esterification reaction which was implemented for 5.0 hours and was terminated at a temperature of 250° C. to obtain an esterification product.

Antimony oxide ($Sb_2O_3$, 0.12 g) and phosphoric acid (0.35 g) were then added into the autoclave, followed by a polycondensation reaction which was implemented for 7 hours and was terminated at a temperature of 280° C. to obtain a second copolyester, which was pelletized to obtain second copolyester pellets.

Examples 1 and 2 and Comparative Examples 1 to 3

The first copolyester pellets of Preparation Example 1 and the second copolyester pellets of Preparation Example 2 in a weight ratio shown in Table 1 were compounded with each other in an extruder, followed by pelletization to obtain copolyester resin pellets.

TABLE 1

| | Weight ratio (pbw)* | | | | |
|---|---|---|---|---|---|
| Copolyester | Comp. Ex. 1 | Ex. 1 | Ex. 2 | Comp. Ex. 2 | Comp. Ex. 3 |
| First copolyester pellets (Prep. Ex. 1) | 99 | 97 | 95 | 93 | 90 |
| Second copolyester pellets (Prep. Ex. 2) | 1 | 3 | 5 | 7 | 10 |

*parts by weight, based on a total weight of the first copolyester and the second copolyester Comparative Example 4

Copolyester pellets of Comparative Example 4 were prepared according to the disclosure of European Patent No. EP 1115925 B1.

Specifically, terephthalic acid (208.20 g), ethylene glycol (145.12 g), isophthalic acid (131.33 g), diethylene glycol (19.50 g), and neopentyl glycol (2.55 g) were added into an autoclave (1 L), followed by an esterification reaction which was implemented for 5.5 hours and was terminated at a temperature of 250° C. to obtain an esterification product.

Antimony oxide ($Sb_2O_3$, 0.12 g) and phosphoric acid (0.35 g) were then added into the autoclave, followed by a polycondensation reaction which was implemented for 7 hours and was terminated at a temperature of 280° C. to obtain a copolyester, which was pelletized to obtain copolyester pellets.

Application Examples 1 and 2

Copolyester resin pellets of each of Examples 1 and were melt-spun into copolyester fibers using a melt-spinning machine (diameter of spinneret orifices being 0.5 mm) at a melt-spinning temperature of 230° C.

Comparative Application Examples 1 and 2

Copolyester pellets of each of Preparation Examples 1 and 2 were melt-spun into copolyester fibers using a melt-spinning machine (diameter of spinneret orifices being 0.5 mm) at a melt-spinning temperature of 230° C.

Comparative Application Examples 3 and 6

Copolyester resin pellets of each of Comparative Examples 1 to 4 were melt-spun into copolyester fibers using a melt-spinning machine (diameter of spinneret orifices being 0.5 mm) at a melt-spinning temperature of 230° C.

Composition Analysis of Examples 1 and 2 and Comparative Example 4

The composition of the copolyester resin pellets of each of Examples 1 and 2 and Comparative Example 4 was analysis using an NMR spectrometer. The results are shown in Table 2 below.

TABLE 2

| Composition (mol %) | Ex. 1 | Ex. 2 | Comp. Ex. 4 |
| --- | --- | --- | --- |
| Terephthalic acid | 61.8 | 61 | 61 |
| Isophthalic acid | 38.2 | 39 | 39 |
| Ethylene glycol | 91.8 | 91.5 | 92.6 |
| Diethylene glycol | 7 | 7 | 6.5 |
| Neopentyl glycol | 1.2 | 1.5 | 0.9 |

The NMR spectrum of Example 1 is shown in FIG. 1. It should be noted that, if chemical bonds are formed between neopentyl glycol for the second copolyester and the monomers for the first copolyester, two chemical shifts (δ) of 1.8 ppm and 5.1 ppm for neopentyl glycol will appear in the NMR spectrum. As shown in FIG. 1, the chemical shifts (δ) for neopentyl glycol are about 1.2 ppm and 4.2 ppm, rather than 1.8 ppm and 5.1 ppm. It is demonstrated that the first copolyester and the second copolyester are merely physically compounded with each other without production of chemical bonding therebetween.

Test of Adhesion to PET Fibers:

PET pellet s (commercially available from Far Eastern New Century Corp. with a model number of CS-190) were melt-spun into PET fibers at a melt-spinning temperature of 280° C. according to the procedure of Application Example 1. The PET fibers were blended with the copolyester fibers of each of Application Examples 1 and 2 and Comparative Application Examples 1 to 6, followed by heating in a heat-setting oven at 145° C. for 5 minutes to obtain composite fibers. The composite fibers were tested twice by stretching using an Instron 5566 universal testing machine at a stretching speed of 50 mm/min. The stretching force was recorded in a gf unit as the copolyester fibers were separated from the PET fibers. The results are shown in Tables 3 and 4. It should be noted that the larger the stretching force, the stronger the adhesion strength between the copolyester fibers and the PET fibers.

TABLE 3

| | Weight ratio of first copolyester to second copolyester (pbw) | | Stretching force (Bonding strength) (gf) | |
| --- | --- | --- | --- | --- |
| | First copolyester | Second copolyester | $1^{st}$ test | $2^{nd}$ test |
| Comp. Appl. Ex. 1 | 100 | 0 | 1021.32 | 1225.03 |
| Comp. Appl. Ex. 2 | 0 | 100 | 1079.55 | 1001.23 |
| Comp. Appl. Ex. 3 | 99 | 1 | 1024.36 | 1047.85 |
| Appl. Ex. 1 | 97 | 3 | 1625.42 | 1701.20 |
| Appl. Ex. 2 | 95 | 5 | 1588.29 | 1478.23 |
| Comp. Appl. Ex. 4 | 93 | 7 | 1104.56 | 1008.07 |
| Comp. Appl. Ex. 5 | 90 | 10 | 1245.56 | 1133.33 |

As shown in Table 3, the stretching forces for Application Examples 1 and 2 are larger than those for Comparative Application Examples 1 to 5. In other words, the adhesion strength between the copolyester fibers of each of Application Examples 1 and 2 and the PET fibers is stronger than that between the copolyester fibers of each of Comparative Application Examples 1 to 5 and the PET fibers, demonstrating that the copolyester resin according to the disclosure obtained by compounding the first copolyester with the second copolyester in a weight ratio of the first copolyester to the second copolyester of from 94:6 to 98:2, can be used to prepare low-melting copolyester fibers which have enhanced adhesion strength to PET fibers.

TABLE 4

| | Copolyester pellets | Stretching force (Bonding strength) (gf) | |
| --- | --- | --- | --- |
| | | $1^{st}$ test | $2^{nd}$ test |
| Appl. Ex. 1 | Ex. 1 | 1625.42 | 1701.20 |
| Comp. Appl. Ex. 6 | Comp. Ex. 4 | 1256.45 | 1289.23 |

As shown in Table 4, the stretching force for Application Example 1 is larger than that for Comparative Application Example 6. In other words, the adhesion strength between the copolyester fibers of Application Example 1 and the PET fibers is stronger than that between the copolyester fibers of Comparative Application Examples 6 and the PET fibers, even though the copolyester pellets of Comparative Example 4 used for forming the copolyester fibers of Comparative Application Example 6 is made by the same monomers in similar amounts as compared to Example 1 (see Table 1). It is demonstrated that as compared to the copolyester pellets made by directly subjecting a combination of terephthalic acid, ethylene glycol, isophthalic acid, diethylene glycol, and neopentyl glycol to a copolymerization according to the disclosure of European Patent No. EP 1115925 B1, the copolyester resin according to the present disclosure made by compounding the first and second copolyesters (which are obtained separately) in a specific weight ratio, can be used to prepare low-melting copolyester fibers which have enhanced adhesion strength to PET fibers. In other words, when the copolyester resin according to the present disclosure made by compounding the first and second copolyesters (which are obtained separately) in a specific weight ratio is used to form binder fibers, the bonding strength between the binder fibers and the polyester fibers or other types of fiber can be enhanced, as compared to the binder fibers of the prior art.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A copolyester resin for preparing a low-melting copolyester fiber, made by compounding a first copolyester with a second copolyester in a weight ratio of the first copolyester to the second copolyester of from 94:6 to 98:2, wherein the first copolyester is obtained by subjecting terephthalic acid, ethylene glycol, isophthalic acid, and diethylene glycol to a copolymerization, and the second copolyester is obtained by subjecting terephthalic acid, ethylene glycol, and neopentyl glycol to another copolymerization.

2. The copolyester resin as claimed in claim 1, wherein the isophthalic acid is in an amount ranging from 38 mol % to 40 mol % based on a total molar amount of the terephthalic acid and the isophthalic acid.

3. The copolyester resin as claimed in claim 1, wherein the diethylene glycol is in an amount ranging from 6 mol % to 8 mol % based on a total molar amount of the ethylene glycol, the diethylene glycol, and the neopentyl glycol.

4. The copolyester resin as claimed in claim 1, wherein the neopentyl glycol is in an amount ranging from 1 mol % to 1.6 mol % based on a total molar amount of the ethylene glycol, the diethylene glycol, and the neopentyl glycol.

5. The copolyester resin as claimed in claim 1, wherein the weight ratio of the first copolyester to the second copolyester is in a range from 95:5 to 97:3.

6. A low-melting copolyester fiber prepared by a process comprising the steps of:

(a) compounding a first copolyester with a second copolyester in a weight ratio of the first copolyester to the second copolyester of from 94:6 to 98:2 to make a copolyester resin, wherein the first copolyester is obtained by subjecting terephthalic acid, ethylene glycol, isophthalic acid, and diethylene glycol to a copolymerization, and the second copolyester is obtained by subjecting terephthalic acid, ethylene glycol, and neopentyl glycol to another copolymerization; and (b) spinning the copolyester resin into fibers.

7. A process for preparing a low-melting copolyester fiber, comprising the steps of:

(a) compounding a first copolyester with a second copolyester in a weight ratio of the first copolyester to the second copolyester of from 94:6 to 98:2 to make a copolyester resin, wherein the first copolyester is obtained by subjecting terephthalic acid, ethylene glycol, isophthalic acid, and diethylene glycol to a copolymerization, and the second copolyester is obtained by subjecting terephthalic acid, ethylene glycol, and neopentyl glycol to another copolymerization; and (b) spinning the copolyester resin into fibers.

* * * * *